United States Patent [19]
Roth

[11] Patent Number: 6,092,974
[45] Date of Patent: Jul. 25, 2000

[54] TRAILER FOR BULK MATERIAL CONTAINERS

[76] Inventor: Jason B. Roth, 201 C St., Box 347, Milford, Nebr. 68405

[21] Appl. No.: 09/195,924

[22] Filed: Nov. 19, 1998

[51] Int. Cl.[7] .............................. A01C 15/00; B60P 1/04; B65G 65/42; B65J 1/14
[52] U.S. Cl. ........................ 414/526; 414/523; 414/813
[58] Field of Search ...................... 414/526, 813, 414/523, 520, 519, 502, 503, 504, 505

[56] References Cited

U.S. PATENT DOCUMENTS

| | | | |
|---|---|---|---|
| 3,963,138 | 6/1976 | Fowler | 414/502 |
| 5,253,746 | 10/1993 | Friesen et al. . | |
| 5,257,893 | 11/1993 | Sevits . | |
| 5,290,139 | 3/1994 | Hedrick | 414/498 |
| 5,465,829 | 11/1995 | Kruse . | |
| 5,468,113 | 11/1995 | Davis | 414/523 |
| 5,520,495 | 5/1996 | Sukup | 414/523 |
| 5,785,481 | 7/1998 | Ockels . | |

FOREIGN PATENT DOCUMENTS 2291132  7/1976  France .................................. 414/523

*Primary Examiner*—Robert P. Olszewski
*Assistant Examiner*—Gerald J. O'Connor
*Attorney, Agent, or Firm*—Henderson & Sturm LLP

[57] ABSTRACT

A low profile trailer adapted for use with bulk material containers having either a central discharge port, or a side discharge port. The trailer includes a trailer bed having a pair of container decks each adapted to receive and support a bulk container. Each of the container decks has both a central discharge opening and a side discharge opening disposed to register with the central and side discharge ports of various bulk containers. A retainer lip extends up from and around three sides of each container deck so that a rigid bulk container may be loaded on the container deck with a fork lift and be conveniently positioned and secured on the deck. All discharge openings communicate with a hopper located under the trailer bed, and a hydraulically powered auger is used to discharge material, such as seed, from the hopper to the seed boxes of a planter.

14 Claims, 2 Drawing Sheets

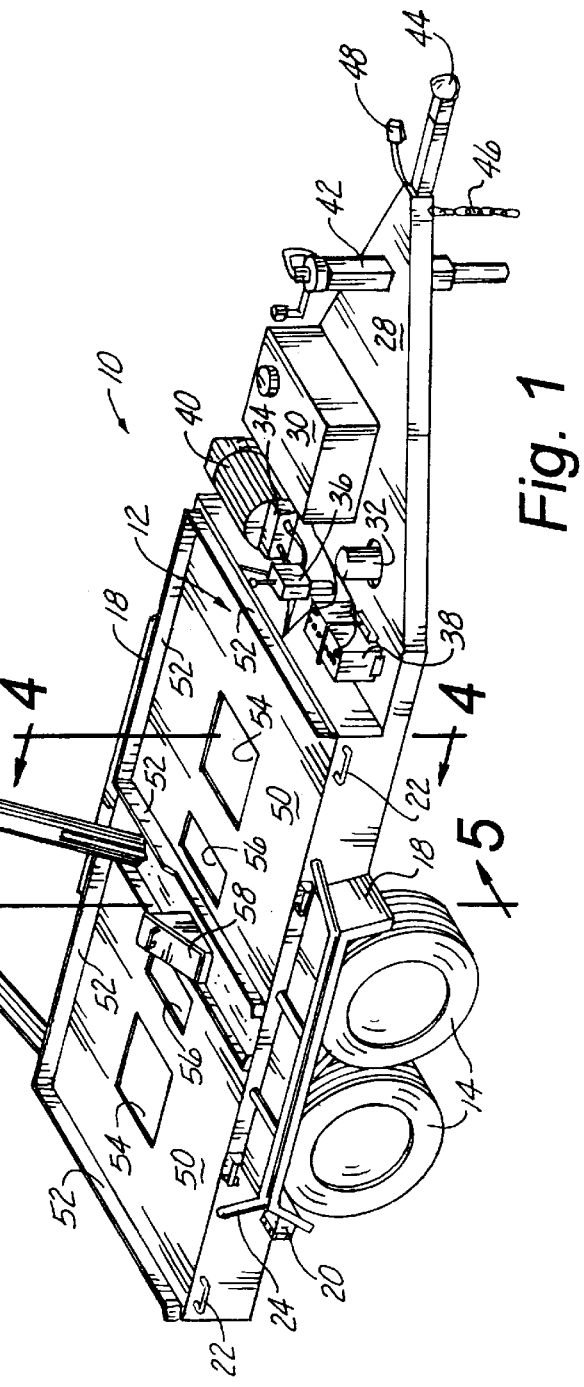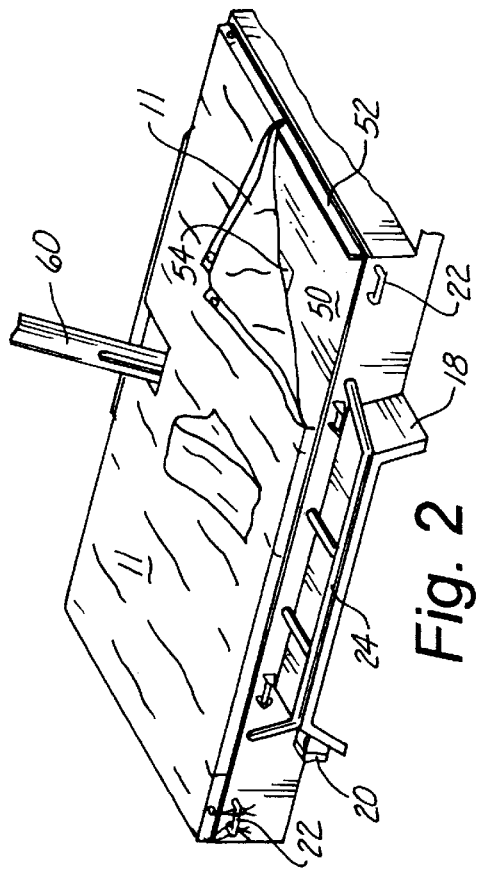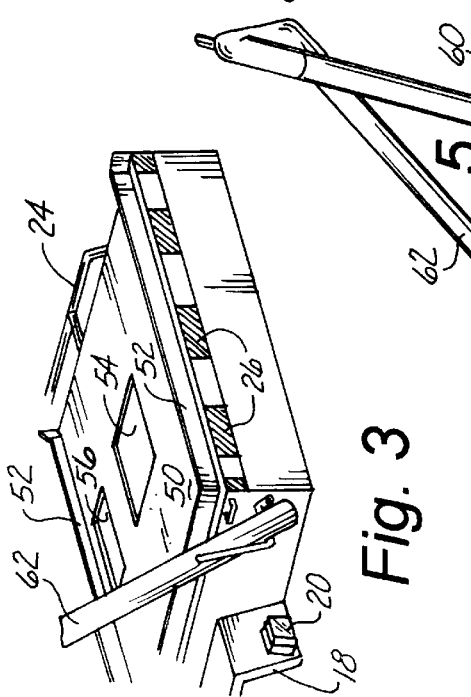

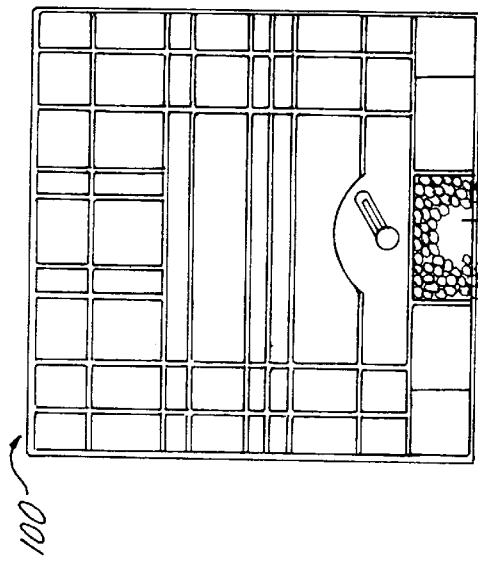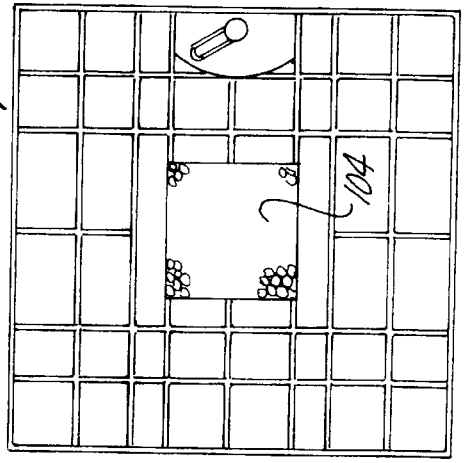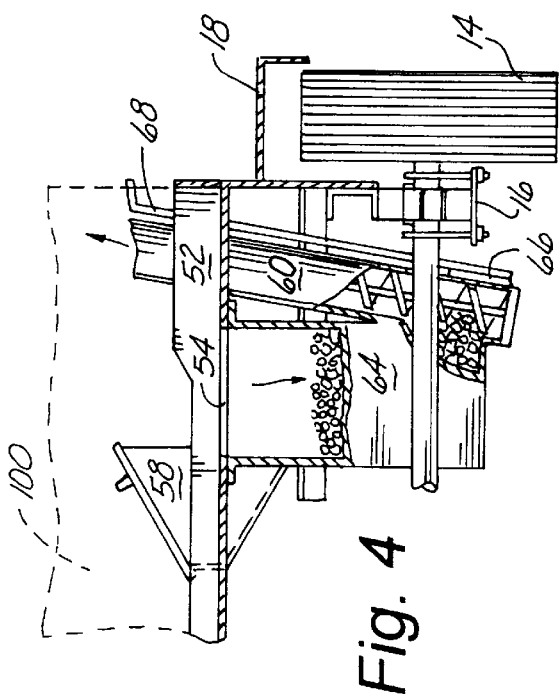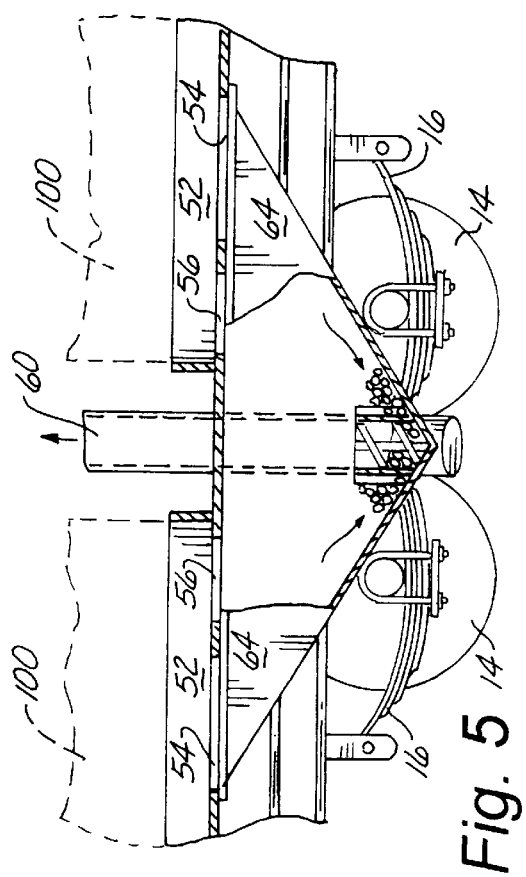

TRAILER FOR BULK MATERIAL CONTAINERS

CROSS REFERENCE TO RELATED APPLICATIONS

Document Disclosure No. 443218 filed Aug. 14,1998.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of devices for dispensing bulk materials, and more particularly to a trailer for bulk material containers.

2. Description of Related Art

As can be seen by reference to the following U.S. Pat. Nos. 5,253,746; 5,257,893; 5,465,829; and 5,785,481, the prior art is replete with myriad and diverse devices for dispensing bulk materials.

While all of the aforementioned prior art constructions are more than adequate for the basic purpose and function for which they have been specifically designed, they are uniformly deficient with respect to their failure to provide a simple, efficient, and practical trailer for bulk material containers having diverse discharge structures.

Recently, rigid plastic seed containers have come into use in agriculture for the storage and transportation of seeds. While the seed containers do offer the capability of stacking several containers at a time, are rodent safe, and water tight, they are heavy when filled and can be awkward to handle. Also, the containers of different suppliers are of different sizes and include different discharge mechanisms.

As a consequence of the foregoing situation, there has existed a longstanding need for a new and improved type of trailer for bulk material containers, and the provision of such a construction is a stated objective of the present invention.

BRIEF SUMMARY OF THE INVENTION

Briefly stated, the present invention provides a low profile trailer adapted for use with bulk material containers having either a central discharge port, or a side discharge port. The trailer includes a trailer bed having a pair of container decks each adapted to receive and support a bulk container. Each of the container decks has both a central discharge opening and a side discharge opening disposed to register with the central and side discharge ports of various bulk containers. A retainer lip extends up from and around three sides of each container deck so that a rigid bulk container may be loaded on the container deck with a fork lift and be conveniently positioned and secured on the deck. All discharge openings communicate with a hopper located under the trailer bed, and a hydraulically powered auger is used to discharge material, such as seed, from the hopper to the seed boxes of a planter.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the trailer of the present invention;

FIG. 2 is a partial perspective view of the trailer bed covered by a tarp;

FIG. 3 is a partial perspective view of the rear of the trailer;

FIG. 4 is a sectional view taken along line 4—4 of FIG. 1 showing the hopper below the trailer bed and the discharge auger and clean out door;

FIG. 5 is a sectional view taken along line 5—5 of FIG. 1 showing the hopper in communication with central and side openings in the trailer bed that correspond to central and side discharge openings in bulk seed containers;

FIG. 6 is a bottom plan view of a rigid bulk seed container having a side discharge port; and FIG. 7 is a bottom plan view of a rigid bulk seed container having a central discharge port.

DETAILED DESCRIPTION OF THE INVENTION

As can be seen by reference to the drawings, and in particularly to FIG. 1, the trailer that forms the basis of the present invention is designated generally by the reference number 10. The trailer 10 includes a low profile bed 12 sized to receive and carry two rigid bulk seed containers 100 positioned end to end. The bed 12 is mounted on a frame that is supported by ground wheels 14 carried on 3,500 pound axles with brakes. The frame and ground wheels 14 are interconnected by a leaf spring suspension 16.

The edge of the trailer bed 12 supports fenders 18 with taillights 20, and tarp and box tie down loops 22 are spaced around the edge. The right side of the bed 12 has a fork lift bumper guard 24 mounted over the fender 18, and the rear carries a series of reflectors 26. A step down platform 28 at the front of the trailer bed 12 carries a hydraulic fluid reservoir 30, a filter 32, a hydraulic pump 34, a DC electric control switch 36, a battery 38, and a gas engine 40. A heavy duty jack 42 supports the platform 28 when it is unhooked from the truck, or other towing vehicle, and a hitch 44 and safety chain 46 are adapted for attachment to the truck to transport the trailer to any desired location. A connector 48 electrically couples the truck lights to the trailer taillights 20. FIG. 2 shows a tarp 11 secured to the loops 22 to cover the trailer bed 12 when not in use.

The top of the trailer bed 12 has two square bulk container decks 50 that are positioned end to end, and are the mirror images of each other. Each container deck 50 includes a retainer lip 52 that extends up from three sides of each deck 50 leaving the right side open to receive a bulk container 100.

Each container deck 50 also includes a central discharge opening 54 and a side discharge opening 56. A covered inspection port 58 and a hydraulically driven auger conveyor 60 are positioned between the decks 50. A flexible or telescopic tube 62 is attached to the top of the conveyor 60.

As best shown in FIGS. 4, and 5, a hopper 64 is located below the trailer bed 12 and is in communication with the central and side discharge openings 54 and 56 formed in each of the container decks 50. The auger conveyor 60 is hydraulically driven by the hydraulic pump 34 and has a feed opening at its open lower end positioned to receive and convey material from the bottom of the hopper 64. A clean out door 66, located opposite from the feed opening is operated by a handle 68 that extends above the trailer bed 12.

FIGS. 6 and 7 are bottom plan views showing two seed containers 100 having different discharge port locations. The container 100 shown in FIG. 6 has a side discharge port 106 that registers with the side discharge opening 56 in each of the container decks 50 when a container 100 is positioned on the deck 50 with the bottom edge adjacent the retainer lips 52. The container 100 shown in FIG. 7 has a central discharge port 104 registerable with the central discharge opening 54 in the deck 50.

When seed containers 100 are delivered and stacked at the farm site with the use of a forklift, the containers 100 can be put directly on the trailer 10 and the trailer 10 pulled to the field for planting. Because of the design of the trailer 10, it can also be safely pulled to the seed company or seed distributor, and the containers 100 put directly on the trailer 10. The trailer 10 is made to road width specifications and is low profile to prevent roll overs. The central and side discharge openings 54 and 56 in each deck 50 allows the use of various containers 100 having either central or side discharge ports 104 or 106. When the trailer 10 is taken to the field, the seed planter can be easily and conveniently filled using the fill tube 62. Also, all moving parts are safely enclosed to minimize the risk of personal injury to the user.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A trailer adapted for use with a bulk material container having either a central discharge port or a side discharge port, the trailer comprising:

a frame;

ground wheels attached to and supporting the frame;

a hitch attached to the frame and adapted for connection to a towing vehicle;

a trailer bed attached to and supported by the frame, the trailer bed comprising:

a container deck adapted to receive and support the bulk material container;

a central discharge opening formed in the deck and positioned to register with the central discharge port of a container; and a side discharge opening formed in the deck and positioned to register with the side discharge port of a container;

a hopper attached to the deck and disposed beneath both the central discharge opening and the side discharge opening; and a discharge conveyor operably attached to the hopper, whereby bulk material is discharged from the container by gravity into the hopper and conveyed from the hopper to another location.

2. The trailer of claim 1 wherein the container deck further includes a retainer lip attached to the deck and extending upwardly therefrom.

3. The trailer of claim 2 wherein the container deck is rectangular and the retainer lip extends up from three sides of the deck leaving an open side.

4. The trailer of claim 3 further including a fork lift bumper guard attached to and extending out from the trailer bed adjacent the open side of the retainer lip.

5. The trailer of claim 3 wherein the bulk material container is a rigid container having a rectangular bottom.

6. The trailer of claim 5 wherein the bulk material is seed.

7. The trailer of claim 1 wherein the trailer bed includes a pair of container decks disposed end to end.

8. The trailer of claim 7 wherein each of the container decks include a retainer lip attached to and extending upwardly therefrom.

9. The trailer of claim 8 wherein the container decks are rectangular and the retainer lips extend up from three sides of each of the decks leaving open sides.

10. The trailer of claim 9 further including a fork lift bumper guard attached to and extending out from the trailer bed adjacent the open sides of the retainer lips.

11. The trailer of claim 9 wherein the bulk material container is a rigid container having a rectangular bottom.

12. The trailer of claim 11 wherein the bulk material is seed.

13. The trailer of claim 1 wherein the discharge conveyor is an auger.

14. The trailer of claim 13 wherein the auger is hydraulically driven.

* * * * *